Patented Oct. 6, 1931

1,825,662

UNITED STATES PATENT OFFICE

WILLIAM J. HALE, OF MIDLAND, MICHIGAN, ASSIGNOR TO THE DOW CHEMICAL COMPANY, OF MIDLAND, MICHIGAN, A CORPORATION OF MICHIGAN

MANUFACTURE OF THIOHYDROXY ORGANIC COMPOUNDS

No Drawing.   Application filed September 4, 1928.   Serial No. 303,957.

The present invention relates to processes for the manufacture of thiohydroxy organic compounds, and more particularly to the control of such processes whereby the formation of secondary products is prevented or repressed, and the reaction is directed substantially to the formation of the principal product in maximum yield.

It is well known that the action of water upon organic halides, and other organic derivatives of inorganic acids capable of hydrolysis, leads not only to the formation of primary substituted derivatives of the water type, known as hydroxides, alcohols, or phenols, but also, by dehydration of such primary compounds, to the formation of secondary substituted derivatives of the water type, known as oxides or ethers. Between such primary compound and the corresponding secondary derivative there is a tendency toward a condition of equilibrium as shown by the following equation where R represents a univalent hydrocarbon radical:

(1)   $2ROH \rightleftharpoons R_2O + H_2O$

The well-known "water type" of organic compound may be described as one wherein the molecule of water as a base undergoes a substitution of one or both of its hydrogen atoms by univalent organic radicals; derivatives of water represented by replacement of the hydrogen by radicals of higher valence than one, however, are not strictly classified as of the water type. When the oxygen of such water type compound is replaced by sulphur, the "hydrogen sulphide" analog of the water type of organic compound is obtained. Under this head are included thiohydroxides, or mercaptans, and sulphides, or thioethers, which compounds in their reaction of formation are subject to a similar condition of equilibrium as the hydroxides and ethers aforementioned, viz:—

(2)   $2RSH \rightleftharpoons R_2S + H_2S$

Such types of analogous reactions, leading to the formation of derivatives of hydrogen sulphide corresponding to those of the water type, are described as thiohydrolysis and dethiohydration, respectively.

I have discovered that, in any given organic chemical reaction wherein one of the primary products gives rise to one or more secondary organic compounds existing in equilibrium therewith, it is feasible to direct such reaction entirely to the preparation of the primary product by artificially establishing and maintaining within the system such concentration of secondary derivatives as is found to be formed under the conditions of the reaction.

To the accomplishment of the foregoing and related ends the invention, then, consists of the steps hereinafter fully described and particularly pointed out in the claims, the following description illustrating and setting forth in detail certain steps embodying the invention, such disclosed means constituting, however, but several of the ways in which the principle of the invention may be used.

In the thiohydrolysis of chlorobenzene by hydrogen sulphide the equations are as follows:

(3)   $C_6H_5Cl + H_2S = C_6H_5SH + HCl$
(4)   $2C_6H_5SH \rightleftharpoons (C_6H_5)_2S + H_2S$ The dethiohydration of the mercaptan, $C_6H_5SH$, yields the thioether, $(C_6H_5)_2S$, as the secondary substituted derivative of hydrogen sulphide, and such process is in equilibrium with the reverse process of thiohydration of the thioether into mercaptan. The reactions in question attain considerable proportions at about 200° to 250° C. The relative concentration of the component factors in the equilibrium determines the direction of the reaction. It would be possible, in accordance with the law of mass action, to conduct the thiohydrolysis of chlorobenzene in the presence of a great excess of hydrogen sulphide, so that the forward direction of the equilibrium equation above would be repressed with the result that very little diphenyl sulphide could be formed. Such procedure, however, even where the handling of great excess of hydrogen sulphide is practical, cannot altogether prevent the formation of some diphenyl sulphide and especially so at the elevated temperatures most favorable for the primary reaction. In so far as some diphenyl sulphide is formed, the yield of primary product is to such extent reduced. It is simpler and more practical to set up initially in the reaction system such concentration of the secondary compound as corresponds to the equilibrium by the addition thereof in like amount to the reacting ingredients at the beginning of the reaction. In the present instance, the equilibrium proportion of diphenyl sulphide is added initially to the reaction mixture. The further formation of diphenyl sulphide at the expense of the primary product, phenyl mercaptan, is thereby repressed, and the thiohydrolysis of the chlorobenzene leads solely to the production of phenyl mercaptan.

Thiohydrolytic reactions may be conducted in anhydrous media, such as alcohol. It is possible, and often from a practical standpoint preferable, however, to conduct such operations in aqueous media under suitable conditions. In such case where water is present, there will exist the two sets of equilibria shown in equations (1) and (2), representing the simultaneous operation of the processes of hydrolysis and thiohydrolysis. When, therefore, the thiohydrolytic operation is to be conducted in the presence of water, it is necessary to take the coexistent hydrolytic action into consideration.

In the practice of this invention it is possible to drive the thiohydrolytic operation entirely to production of a mercaptan, and in similar fashion the simultaneous hydrolytic operation is limited to the production of an alcohol. The production of a certain amount of alcohol by hydrolysis due to the presence of water cannot be entirely prevented, although it may be controlled by regulating the concentration of the inorganic reaction components furnishing the sulphhydric and hydroxide radicals or ions. When thiohydrolysis is to be carried out in an aqueous medium it is, therefore, required that such proportional quantities of organic sulphide together with organic oxide as are each capable of formation under the conditions of the reaction shall be conjointly introduced into the system in order to maintain the latter in an approximate state of balance as affects the concentration of primary products, mercaptan and alcohol, on the one hand and secondary derivatives, sulphide and oxide, on the other. Thiohydrolytic operations in aqueous media are thereby directed substantially to production of mercaptans, together with whatever proportional amount of alcohols cannot be avoided due to the presence of water.

Example: A mixture of one mole chlorobenzene and slightly more than 2 moles of an alkali metal sulphhydrate, or corresponding equivalent of an alkaline earth metal sulphhydrate, in concentrated aqueous solution is placed in a suitable enclosed vessel or autoclave capable of withstanding pressure as high as 3,000 pounds per square inch, or more. Approximately 10 per cent of diphenyl sulphide and 3 per cent of diphenyl oxide, both figured on the basis of chlorobenzene used, are added, such amounts of the last two named compounds having been determined in a previous run as being formed under the conditions of the reaction. This mixture is then saturated with hydrogen sulphide, introduced under a moderate pressure, i. e., between one and two atmospheres. The temperature is thereupon gradually increased to approximately 250° C., and maintained for 2 to 3 hours. After cooling and release of pressure, the reaction mass is separated from the oily layer containing diphenyl sulphide and diphenyl oxide, which is returned to a succeeding reaction. The aqueous portion, consisting of a solution of salts of thiophenol and phenol, is acidulated and the latter compounds distilled off with steam. The crude product is then dried and fractionally distilled to separate the pure products.

In a continuous process the diphenyl sulphide and diphenyl oxide may be continuously returned to the initial stage, thus maintaining within the system a substantially constant quantity of those compounds which will not be increased by any further formation thereof from the reacting substances. The maximum yield of primary products will accordingly be attained, without loss due to the formation of secondary products.

Other modes of applying the principle of my invention may be employed instead of those explained, change being made as regards the process herein disclosed, provided the means stated by any of the following claims or the equivalent of such stated means be employed.

I therefore particularly point out and distinctly claim as my invention:—

1. In a process for the manufacture of a thiohydroxy compound, the step which consists in reacting between hydrogen sulphide and a monohalogenated hydrocarbon while including the corresponding thioether with the reacting ingredients.

2. In a process for the manufacture of a thiohydroxy compound, the step which consists in reacting between hydrogen sulphide and a monohalogenated hydrocarbon while including the corresponding thioether with the reacting ingredients in amount sufficient to maintain the system in an approximate state of chemical balance with respect thereto.

3. In a process for the manufacture of a thiohydroxy compound, the steps which consist in reacting between hydrogen sulphide and a monohalogenated hydrocarbon, separating the thiohydroxy compound formed from the accompanying thioether, and returning the latter to the initial reaction.

4. In a process for the manufacture of a thiohydroxy compound, the step which consists in reacting between hydrogen sulphide and a monohalogenated hydrocarbon in a medium consisting of an aqueous solution of an alkali or alkaline-earth metal sulphhydrate while including the corresponding thioether and organic oxide with the reacting ingredients.

5. In a process for the manufacture of a thiohydroxy compound, the step which consists in reacting between hydrogen sulphide and a monohalogenated hydrocarbon in a medium consisting of an aqueous solution of an alkali or alkaline-earth metal sulphhydrate while including the corresponding thioether and organic oxide with the reacting ingredients in amount sufficient to maintain the system in an approximate state of chemical balance with respect thereto.

6. In a process for the manufacture of a thiohydroxy compound, the steps which consist in reacting between hydrogen sulphide and a monohalogenated hydrocarbon in a medium consisting of an aqueous solution of an alkali or alkaline-earth metal sulphhydrate, separating the thiohydroxy compound formed from the accompanying thioether and organic oxide, and returning such last named two compounds to the initial reaction.

Signed by me this 31st day of August, 1928.

WILLIAM J. HALE.